(12) United States Patent
Pean et al.

(10) Patent No.: US 9,910,812 B2
(45) Date of Patent: Mar. 6, 2018

(54) INITIATING MULTIPLE DATA TRANSACTIONS ON A SYSTEM BUS

(71) Applicant: Atmel Corporation, San Jose, CA (US)

(72) Inventors: Guillaume Pean, Aix en Provence (FR); Vincent Debout, La Ciotat (FR); Patrice Vilchez, Toulon (FR)

(73) Assignee: Atmel Corporation, San Jose, CA (US)

( * ) Notice: Subject to any disclaimer, the term of this patent is extended or adjusted under 35 U.S.C. 154(b) by 538 days.

(21) Appl. No.: 14/505,003

(22) Filed: Oct. 2, 2014

(65) Prior Publication Data

US 2016/0098375 A1 Apr. 7, 2016

(51) Int. Cl.
*G06F 13/00* (2006.01)
*G06F 13/42* (2006.01)
*G06F 9/46* (2006.01)
*G06F 13/40* (2006.01)

(52) U.S. Cl.
CPC .......... *G06F 13/4208* (2013.01); *G06F 9/466* (2013.01); *G06F 13/4022* (2013.01)

(58) Field of Classification Search
CPC .................... G06F 13/4022; G06F 13/4208
See application file for complete search history.

(56) References Cited

U.S. PATENT DOCUMENTS

| 5,815,734 | A | 9/1998 | Lee |
| 6,457,074 | B1 | 9/2002 | Gaillard |
| 6,499,077 | B1* | 12/2002 | Abramson .......... G06F 13/4059 710/104 |
| 7,398,335 | B2 | 7/2008 | Sonksen |
| 2003/0221026 | A1* | 11/2003 | Newman ................. H04L 29/06 710/8 |
| 2014/0089536 | A1 | 3/2014 | Pedersen |
| 2015/0161065 | A1 | 6/2015 | Lunadier et al. |
| 2015/0188562 | A1 | 7/2015 | Lam |
| 2016/0124878 | A1 | 5/2016 | Pean et al. |
| 2016/0132445 | A1 | 5/2016 | Birsan et al. |

* cited by examiner

*Primary Examiner* — Zachary K Huson
(74) *Attorney, Agent, or Firm* — Fish & Richardson P.C.

(57) ABSTRACT

Initiating data transactions on a system bus is disclosed. In some implementations, a controller receives first information from a first peripheral requesting a first data transaction. The first information is received over a first communication link between the controller and the first peripheral. The controller receives second information from a second peripheral requesting a second data transaction. The second information received over a second communication link between the controller and the second peripheral. The controller determines first and second ranks for the first and second data transactions, respectively, based on the first and second information, and initiates based on the first and second ranks, the first and second data transactions on a system bus.

17 Claims, 3 Drawing Sheets

INITIATING MULTIPLE DATA TRANSACTIONS ON A SYSTEM BUS

TECHNICAL FIELD

This disclosure relates generally to data transaction initiation on a system bus.

BACKGROUND

In example scenario, certain microcontrollers can be configured to communicate with a variety of peripherals using a variety of communication protocols. The peripherals can compete for access to a system bus for communicating with the microcontroller and may be capable of operating with respect to different levels of quality-of-service (QoS). If multiple peripherals are simultaneously operating it may be useful to perform a specific peripheral transaction (e.g., a memory read transaction) before performing another peripheral transaction. Indeed, in an embodiment, a ranking or priority algorithm may be implemented to accurately determine the appropriate ranking or priority level for each transaction.

In one example scenario, a "round robin" strategy may be implemented that provides each bus channel an equal part of the system bus bandwidth and ensures that no single channel is denied access for a relatively long period of time. In accordance with an example implementation, however, the system bus bandwidth may be granted to relatively low priority or non-critical bus channels when high-priority or critical bus channels are requesting data transfer.

SUMMARY

In some implementations, a method comprises: receiving, by a controller, first information from a first peripheral requesting a first data transaction, the first information received over a first communication link between the controller and the first peripheral; receiving, by the controller, second information from a second peripheral requesting a second data transaction, the second information received over a second communication link between the controller and the first peripheral; determining, by the controller, first and second ranks for the first and second data transactions, respectively, based on the first and second information; and initiating, based on the first and second ranks, the first and second data transactions on a system bus.

In some implementations, a method comprises: determining, by a peripheral requesting access to a system bus, a state of the peripheral; generating information indicating the state of the peripheral; transmitting the information over a communication link to a controller; and receiving, from the controller, access to the system bus according to the state of the peripheral and states of other peripherals requesting access to the system bus.

In some implementations, a system comprises: a system bus; a first peripheral coupled to the system bus; a second peripheral coupled to the system bus; a controller coupled to the system bus, the controller configured to receive over a first communication link first information from the first peripheral requesting a first transaction, and to receive over a second communication link second information from the second peripheral requesting a second data transaction; determine first and second ranks for the first and second data transactions, respectively, based on the first and second information; and initiate, based on the first and second ranks, the first and second data transactions on the system bus.

Other implementations are directed to methods, circuits, systems and computer-readable mediums.

DETAILED DESCRIPTION

Autonomous handling of transactions and QoS between a controller and peripherals are disclosed. In some implementations, communication links between the peripherals and the controller allow the peripherals to send advance information to the controller that can be used by the controller to optimize system bus access in terms of bandwidth, transaction priority and QoS.

Figure 1:
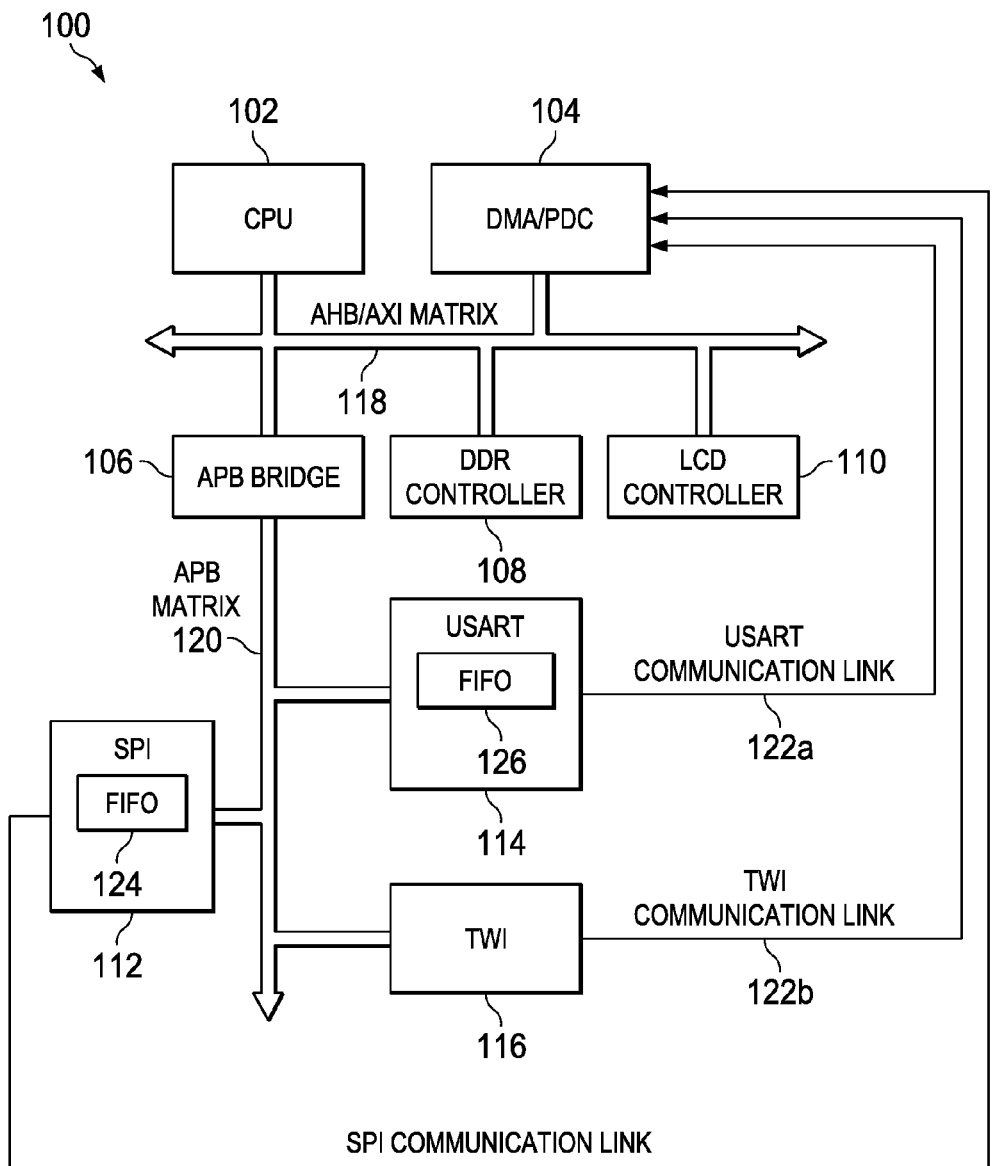
FIG. 1 is a block diagram of an example microcontroller system for autonomous handling of transactions and QoS between a controller and peripherals in an embodiment.

FIG. 1 is a block diagram of an example microcontroller system 100 for autonomous handling of transactions and QoS between a controller and peripherals. In some implementations, microcontroller system 100 can include central processing unit 102 (CPU), controller 104, peripheral bus bridge 106, memory controller 108, display controller 110, and peripheral interfaces 112, 114, 116. In practice, system 100 can include more or fewer components or subsystems than is shown in FIG. 1.

Controller 104 can be, for example, a direct memory access (DMA) controller or peripheral DMA controller (PDC). A DMA controller transfers data between memories and peripherals with minimal CPU intervention. While the CPU spends time in low-power sleep modes or performs other tasks, the DMA controller offloads the CPU by taking care of data copying from one area to another. A complete DMA read and write operation between memories and/or peripherals is called a DMA transaction. A transaction is done in data blocks and the size of the transaction (number of bytes to transfer) is selectable from software and controlled by the block size and repeat counter settings.

A PDC transfers data between on-chip serial peripherals and on and/or off-chip memories. Using the PDC removes processor overhead by reducing its intervention during the transfer. This significantly reduces the number of clock cycles required for a data transfer, which improves microcontroller performance. To launch a transfer, the peripheral triggers its associated PDC channels by using transmit and receive signals. When the programmed data is transferred, an end of transfer interrupt is generated by the peripheral itself.

Peripheral bridge 106 can be, for example, an advanced microcontroller bus architecture (AMBA) peripheral bus (APB). Memory controller 108 can be, for example, a double data rate (DDR) memory controller used to drive DDR memory (e.g., SDRAM), where data is transferred on both rising and falling edges of the system's memory clock.

Display controller 110 can be, for example a liquid crystal display (LCD) controller for running a segment of an LCD display. Peripheral interfaces 112, 116 can be, for example, a serial peripheral interface (SPI) or two-wire interface (TWI). Peripheral interface 114 can be, for example, a universal asynchronous receiver/transmitter (USART). Peripheral interfaces 112, 114, 116 can be coupled to system bus 118 through peripheral bridge 106 and peripheral bus 120. System bus 118 can be, for example, an AMBA high-performance bus (AHB) or bus matrix (AXI). Peripheral bus 120 can be, for example, an APB bus matrix.

In some implementations, peripherals 112, 114, 116 each have a physically separate communication link 122a-122c (each physically separate and independent of the system bus channels) to controller 104 that allows each of peripherals 112, 114, 116 to communicate directly with controller 104. In some implementations, one or more peripherals 112, 114, 116 can include a transaction queue for storing read/write transaction data for the peripheral. For example, peripheral 114 (e.g., a USART) can include a First-In-First-Out (FIFO) transaction queue 126 that stores transaction data in the order the transaction data are received, as described in reference to FIG. 2. Likewise, peripheral 112 (e.g., an SPI) can include FIFO 124 for storing read/write transaction data.

In some implementations, communication links 122a-122c are configured to send advance (before data transfer) information to controller 104 that includes peripheral state information, activity reports, QoS estimates and/or any other information that can be used by controller 104 to optimize accesses to system bus 118 in terms of bandwidth, data transfer priority and QoS. In some implementations, one or more of communication links 122a-122c can be a fixed-width bus. The advance information can be encoded and sent on the bus using a predefined protocol. Controller 104 can use the advance information received on communication links 122a-122c to perform a number of optimizations, including but not limited to grouping transactions and dynamically assigning transfer priority levels or ranks to the transactions and appropriate QoS information to active data channels. For example, controller 104 can determine the data transfer size and length of a bus access or change a channel arbitration strategy to give a data channel more or full bandwidth for a period of time to avoid an application crash or system failure. In some implementations, controller 104 includes transmit (TX) priority list 202 and QoS table 204, respectively, for managing transmit priority and QoS for active data channels, as described in reference to FIG. 2.

Figure 2:
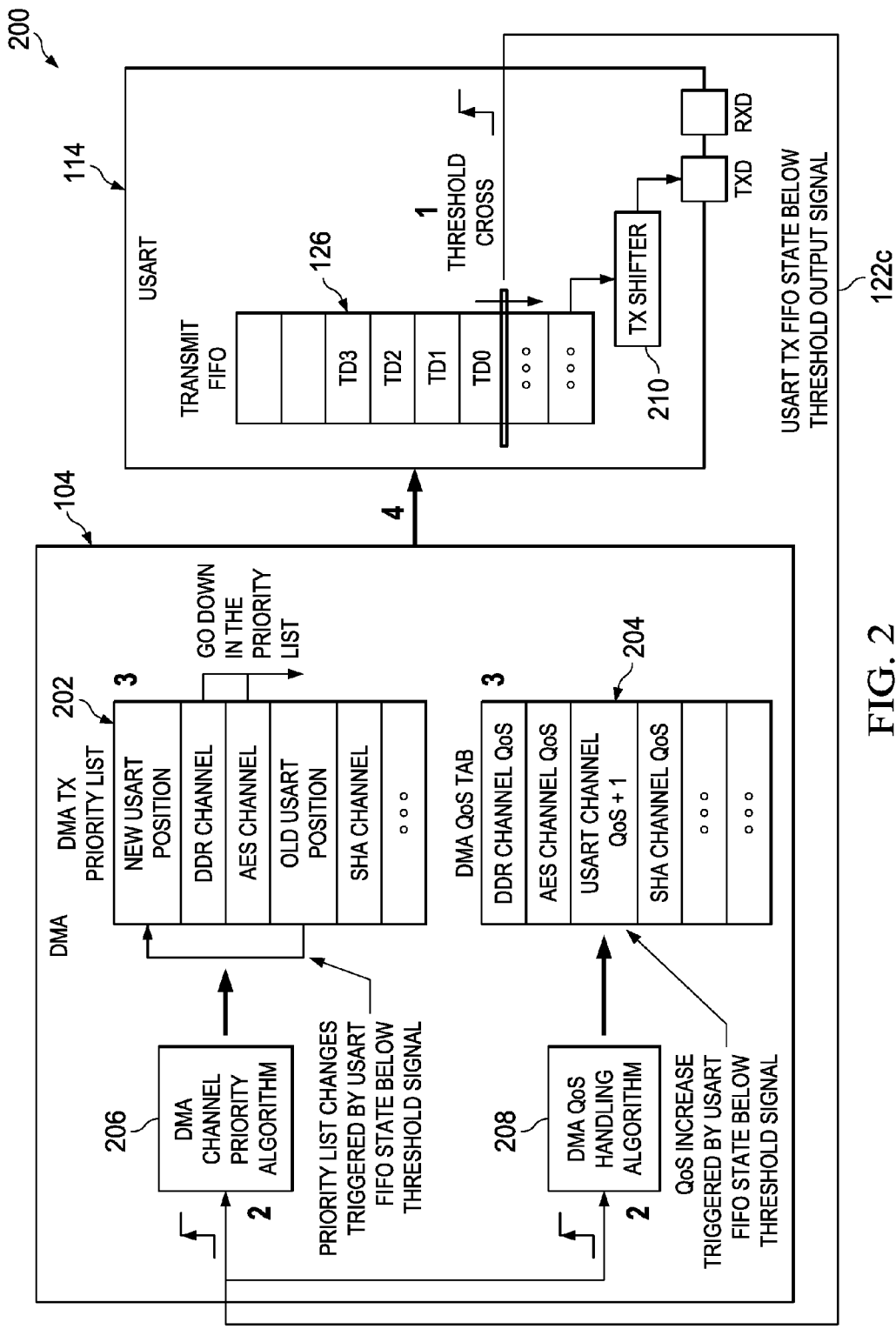
FIG. 2 illustrates an example implementation of autonomous handling of transfer and QoS between a controller and peripherals in an embodiment.

FIG. 2 illustrates autonomous handling of transactions and QoS between a controller and peripherals. The figure includes numerical designations 1-4 to highlight for the user the steps of data transfer. In the example shown, at step 1, peripheral 114 (e.g., USART peripheral) sends information on communication link 122c to controller 104 (e.g., a DMA controller). Network data that is received by peripheral 114 is stored in FIFO 126, which has a finite depth. When FIFO 126 reaches an "almost empty" state (e.g., two full queue slots), peripheral 114 sends a threshold signal directly to controller 104 over communication link 122c to indicate the "almost empty" state of FIFO 126. Controller 104 uses the threshold signal to group and optimize data transactions for peripheral 114. Because USART protocol is byte oriented, data is transmitted byte by byte. Accordingly, it is more efficient in terms of number of system bus accesses for controller 104 to wait until peripheral 114 has 4 free queue slots in FIFO 126 and then issue a single word size (4 bytes) data transfer, rather than issuing a single byte transfer each time a byte is transmitted by peripheral 114 from the network.

At steps 2 and 3, controller 104 uses the threshold signal received on communication link 122c to modify TX priority list 202, which is used to manage data transaction order for active data channels (e.g., DDR channel, AES channel, USART channel, SHA channel). In the example shown, the threshold signal causes DMA channel priority module 206 to move the position of the USART data channel from the third position (the old USART position) to the first position or top of transaction priority list 202 (the new USART position), so that the USART transaction can be executed next by controller 104. In some implementations, TX priority list 202 can be modified in other ways. For example, an active data channel can be inserted anywhere in TX priority list 202 including the top, bottom or middle of TX priority list 202. In some implementations, DMA channel priority module 206 can include arbitration logic based on the protocol of the active data channel and threshold signals received from peripherals 112, 114, 116.

Some example logic that could be applied to peripherals 112 (e.g., an SPI peripheral), 114 (e.g., a USART peripheral), 116 (e.g., a TWI peripheral) could be: If T1 or T3>0 and T2>0, then move the peripheral 114 transaction to the top of TX priority list 202 and increment the QoS value in DMA QoS table 204, where T1, T2, T3 are binary threshold signals for peripherals 112, 114, 116, respectively, and T1, T2, T3="1" indicates an "almost empty" or "almost full" state of the internal FIFOs of the peripherals 112, 114, 116, respectively.

Referring to FIGS. 1 and 2, DMA channel priority module 206 arbitrates between active data channels based on the threshold signals received from peripherals 112, 114, 116. Controller 104 can decide which data transaction to issue first when two or more peripherals 112, 114, 116 have provided threshold signals indicating their respective internal transaction FIFOs are "almost empty." The arbitration can be based on the protocols used by the peripherals. For example, peripheral 112 may use network protocol (e.g., I2C protocol) that uses clock stretching and wait states. If FIFO 124 of peripheral 112 is full and there is still data to be received from the network, peripheral 112 can put the network into a wait state while FIFO 124 is full. On the other hand, peripheral 114 can use a protocol (e.g., USART protocol) that does not allow wait states, making critical the need to read data on peripheral 114 if FIFO 126 is full. By knowing the FIFO states of peripherals 112, 114, 116 and whether peripherals 112, 114, 116 can place their network media in a wait state, controller 104 can decide to read peripheral 114 first (because the USART protocol does not allow wait states) to reduce the risk of data loss or application or system failure.

Referring again to steps 2 and 3 in FIG. 2, DMA QoS handling module 208 uses threshold signals from peripherals 112, 114, 116 to assign a QoS value to the data channel of the USART (QOS+1) that is higher than the QoS values assigned to the other active data channels included in DMA QoS table 204. In this example, the QoS value for the USART data channel is higher that the QoS values for the other active data channels because of the high latency of a USART data transfer resulting from, for example, bus arbitration on a heavily loaded system bus and/or the inability of the USART protocol to place the USART network media into a wait state. The QoS value can be represented in DMA QoS table 204 in any desired format including a number system. For example, QoS numbers can range from 1 to 5 with 1 being the lowest QoS and 5 being the highest QoS.

In some implementations, QoS value can have a base value (e.g., 0), which can be incremented by 1 to increase the QoS for the corresponding active data channel.

An example system and process for determining a QoS value for a data transfer request that could be implemented by DMA QoS handling module 208 is described in co-pending U.S. patent application Ser. No. 14/100,225, for "System Bus Transaction Queue Reallocation," filed Dec. 9, 2013, which patent application is incorporated by reference herein in its entirety.

In some implementations, peripherals 112, 114, 116 can calculate a local estimate of the QoS value that represents the urgency for controller 104 to serve the peripheral. This QoS value is based on the internal state of the peripheral (e.g., FIFO state, Finite State Machine (FSM) state, protocol information) and the estimation of the ongoing traffic on the network. Controller 104 will use the QoS value to modify the QoS of any pending data transaction (including ones not dedicated to the peripheral) to serve the requesting peripheral faster and prevent data loss. In some implementations, controller 104 can dynamically change the strategy that applies to each active data channel and anticipate potential issues based on the information received by peripherals 112, 114, 116.

At step 4, controller 104 initiates a data transaction on the system bus according to the TX priority list 202 and DMA QoS table 204 using the appropriate protocol for peripheral 114. In some implementations, the data transfer request at the bottom of FIFO 126 is placed on system bus 118 by transaction shifter 208 (e.g., one or more shifter registers).

In some implementations, the implementations described above can be implemented in a system-on-chip (SoC) that includes a microcontroller system 100 to allow the SoC to autonomously optimize the number of bus transactions issued to transfer data from/to peripherals. The SoC can select the best order and time for the data transfer. The SoC can adapt DMA/PDC channel arbitration strategy when needed and associate the appropriate QoS information for each active data channel. Implementing microcontroller system 100 in SoC can simplify application development using the SoC because optimized DMA/PDC transactions are guaranteed and handled autonomously by the SoC. The SoC will be more reliable and less impacted by latency issues because the DMA/PDC data transactions are optimized and prioritized when needed.

Figure 3:
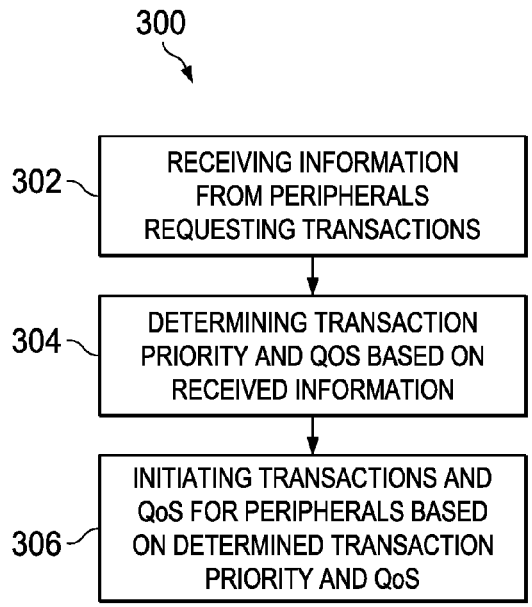
FIG. 3 is a flow diagram of an example process implemented by a controller for autonomous handling of transactions and QoS between a controller and peripherals in an embodiment.

FIG. 3 is a flow diagram of an example process 300 implemented by a controller for autonomous handling of transactions and QoS between a controller and peripherals. Process 300 can be performed by microcontroller system 100, as described in reference to FIGS. 1-2. Process 300 can be implemented by software instructions stored on a non-transitory, computer-readable medium, in hardware or by a combination of software and hardware.

In some implementations, process 300 can begin by receiving information from peripherals requesting transactions that require access to a system bus (302). The information is sent directly to a DMA controller or PDC over a dedicated communication link that is independent of the system bus. The communication link can be a fixed-width bus. The information can be encoded using a predefined protocol that is known to the DMA/PDC controller and the peripherals. The information can include any information that is useful to a controller to determine transaction priority and QoS for the data channel, including but not limited to transaction queue (FIFO) state, FSM state, protocol information (whether wait states or clock stretching is available) and network activity reports (e.g., indicating a busy network). In one example implementation, the information includes a threshold signal (e.g., a binary signal) that indicates that an internal transaction queue (FIFO) in the peripheral is almost full.

Process 300 can continue by determining ranks and QoS for the active data channels based on the received information (304). For example, the received information can be used to modify a TX priority list and/or QoS table stored in the controller.

Process 300 can continue by initiating transactions and QoS for the peripherals according to the determined ranks and QoS (306). For example, the modified TX priority list and QoS table can be consulted by a DMA channel priority module and DMA QoS handling module, respectively, to determine which active data channel will receive access to the system bus to perform the transaction (e.g., a memory read or write transaction) and the QoS the active data channel will receive for the transaction.

Figure 4:
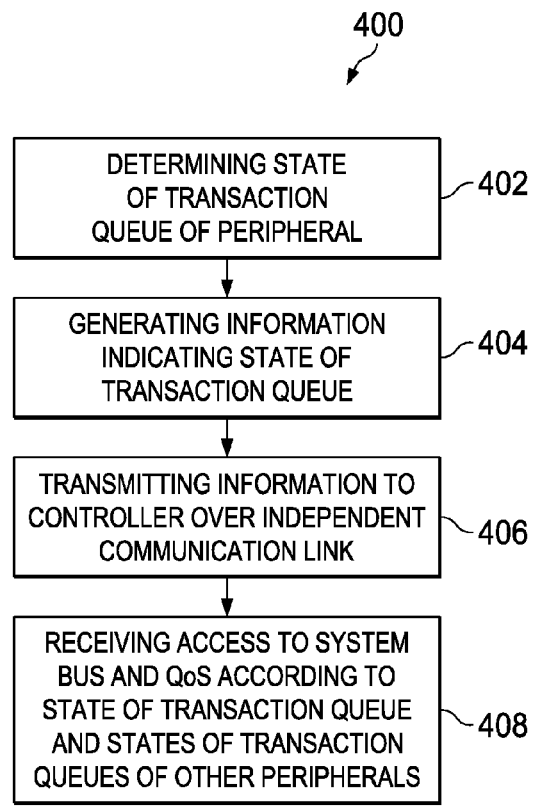
FIG. 4 is a flow diagram of an example process implemented by a peripheral for autonomous handling of transactions and QoS between a controller and peripherals in an embodiment.

FIG. 4 is a flow diagram of an example process 400 implemented by a peripheral for autonomous handling of transactions and QoS between a controller and peripherals. Process 400 can be performed by peripheral 114 as described in reference to FIGS. 1-2.

In some implementations, process 400 can begin by determining a state of a transaction queue of a peripheral (402). For example, a processor or logic in the peripheral can determine that a state of a transaction queue (FIFO) of the peripheral is almost full or almost empty.

Process 400 can continue by generating information indicating the state of the peripheral (404). For example, a binary threshold signal can be generated to indicate the almost full state or almost empty state of the transaction queue (FIFO).

Process 400 can continue by transmitting the information over a communication link to a controller (406). For example, the threshold signal can be sent over a communication link with the controller.

Process 400 can continue by receiving access to a system bus according to the state of the transaction queue and the states of other transaction queues of peripherals requesting access to the system bus (408). For example, the peripheral can receive access to the system bus from the controller to carry out a transaction (e.g., a read or write transaction).

The autonomous handling of transactions and QoS between a controller and peripherals described herein provides one or more of the following advantages. System bus bandwidth can be freed up by grouping transaction requests from peripherals based on information provided by the peripherals over separate communication links (independent of system bus channels) with the DMA/PDC controller. The information allows the controller to prioritize peripheral transactions and QoS to improve overall system reliability and stability without increasing software development cost or complexity. In some implementations, a system on chip (SoC) that includes autonomous handling of transactions between a controller and peripherals can autonomously optimize the number of system bus accesses issued for peripheral transactions and to select an appropriate transaction order and time for the transaction. The SoC can adopt an appropriate data channel arbitration strategy when needed and select an appropriate QoS for the data channel.

While this document contains many specific implementation details, these should not be construed as limitations on the scope what may be claimed, but rather as descriptions of features that may be specific to particular embodiments.

Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

What is claimed is:

1. A method comprising:
receiving, by a controller, first information from a first peripheral requesting a first data transaction, the first information received over a first communication link between the controller and the first peripheral;
receiving, by the controller, second information from a second peripheral requesting a second data transaction, the second information received over a second communication link between the controller and the second peripheral;
determining, by the controller, quality of service (QoS) values for the first and second transactions based on the first and second information;
determining, by the controller, first and second ranks for the first and second data transactions based on the first and second information; and
initiating, based on the first and second ranks and the QoS values, the first or second data transaction on a system bus.

2. The method of claim 1, wherein the controller is a direct memory access (DMA) controller and the first and second communication links provide direct communication paths from the first and second peripherals to the DMA controller.

3. The method of claim 1, where determining, by the controller, first and second ranks for the first and second data transactions further comprises:
using the first information to determine a state of a first transaction queue of the first peripheral;
using the second information to determine a state of a second transaction queue of the second peripheral; and
determining the first and second ranks of the first and second data transactions based on the determined states of the first and second transaction queues.

4. The method of claim 3, where the state of the first or second transaction queue is an almost full state or almost empty state.

5. The method of claim 1, where the first or second communication link is a fixed-width bus and the first or second information is encoded with a protocol.

6. A system comprising:
a system bus;
a first peripheral coupled to the system bus;
a second peripheral coupled to the system bus;
a controller coupled to the system bus, the controller configured to receive over a first communication link first information from the first peripheral requesting a first data transaction, and to receive over a second communication link second information from the second peripheral requesting a second data transaction;
determining, by the controller, quality of service (QoS) values for the first and second transactions based on the first and second information;
determine first and second ranks for the first and second data transactions based on the first and second information; and
initiate, based on the first and second ranks and the QoS values, the first or second data transaction on the system bus.

7. The system of claim 6, wherein the controller is a direct memory access (DMA) controller and the first and second communication links provide direct communication paths from the first and second peripherals to the DMA controller.

8. The system of claim 6, where using, by the controller, the first and second information to determine first and second ranks for the first and second data transactions further comprises:
using the first information to determine a state of a first transaction queue of the first peripheral;
using the second information to determine a state of a second transaction queue of the second peripheral; and
determining the first and second ranks of the first and second data transactions based on the determined states of the first and second transaction queues.

9. The system of claim 8, where the state of the first or second transaction queue is an almost full state or almost empty state.

10. The system of claim 6, where the first or second communication link is a fixed-width bus and the first or second information is encoded with a protocol.

11. A non-transitory, computer-readable medium storing instructions, which, when executed by one or more processors, causes the one or more processors to perform operations comprising:
receiving first information from a first peripheral requesting a first data transaction, the first information received over a first communication link;
receiving second information from a second peripheral requesting a second data transaction, the second information received over a second communication link;
determining quality of service (QoS) values for the first and second transactions based on the first and second information;
determining first and second ranks for the first and second data transactions based on the first and second information; and
initiating, based on the first and second ranks and the QoS values, the first or second data transaction on a system bus.

12. The computer-readable medium of claim 11, wherein the controller is a direct memory access (DMA) controller and the first and second communication links provide direct communication paths from the first and second peripherals to the DMA controller.

13. The computer-readable medium of claim 11, where using the first and second information to determine ranks for the first and second data transactions further comprises:
using the first information to determine a state of a first transaction queue of the first peripheral;
using the second information to determine a state of a second transaction queue of the second peripheral; and
determining the first and second ranks of the first and second data transactions based on the determined states of the first and second transaction queues.

14. The computer-readable medium of claim 13, where the state of the first or second transaction queue is an almost full state or almost empty state.

15. The computer-readable medium of claim 11, where the first or second communication link is a fixed-width bus and the first or second information is encoded with a protocol.

16. A system comprising:
   an interface configured to couple to a direct communication link with a direct memory access (DMA) controller;
   memory;
   a processor operable to:
      implement a transaction queue in the memory;
      determine a state of the transaction queue;
      generate quality of service (QoS) information indicating the state of the transaction queue;
      transmit the QoS information using the interface; and
      receive, from the DMA controller using the interface, access to a system bus according to the state of the transaction queue.

17. The system of claim 16, where the information indicates a number of slots available in the transaction queue.

\* \* \* \* \*